United States Patent [19]
Christopher

[11] 3,852,908
[45] Dec. 10, 1974

[54] PNEUMATIC APPARATUS FOR SIMULTANEOUSLY RAISING A PLURALITY OF LOBSTER TRAPS FROM THE BOTTOM TO THE SURFACE OF A BODY OF WATER

[76] Inventor: John P. Christopher, Box 19D, RR A-1, Islamorada, Fla. 33036

[22] Filed: Mar. 22, 1973

[21] Appl. No.: 343,865

[52] U.S. Cl. ................................................ 43/102
[51] Int. Cl. ............................................ A01k 69/08
[58] Field of Search ............ 43/100, 102, 103, 6.5, 43/4.5

[56] References Cited
UNITED STATES PATENTS
| | | | |
|---|---|---|---|
| 1,761,365 | 6/1930 | Reed | 43/102 |
| 1,903,276 | 3/1933 | Yanga | 43/102 |
| 2,414,055 | 1/1947 | Miller | 43/6.5 |
| 3,003,278 | 10/1961 | Armentrout | 43/103 |
| 3,722,126 | 3/1973 | Whipple | 43/6.5 |
| 3,754,348 | 8/1973 | Ramsey | 43/103 |

Primary Examiner—Warner H. Camp

[57] ABSTRACT

A plurality of gravity submersible lobster traps secured in predetermined spaced relation along the length of an air hose. Each of the traps is provided with an inflatable float means connected to the hose and each float member having a pre-adjusted air escape valve therein. One end of the hose is connected to a source of compressed air in a boat and the opposite end of the hose is closed. When compressed air from the source is released into the hose, the floats on all traps will be inflated to a predetermined pressure dependent upon the adjustment of the valves, which will raise all traps to the surface for the convenient extraction of the catch.

2 Claims, 11 Drawing Figures

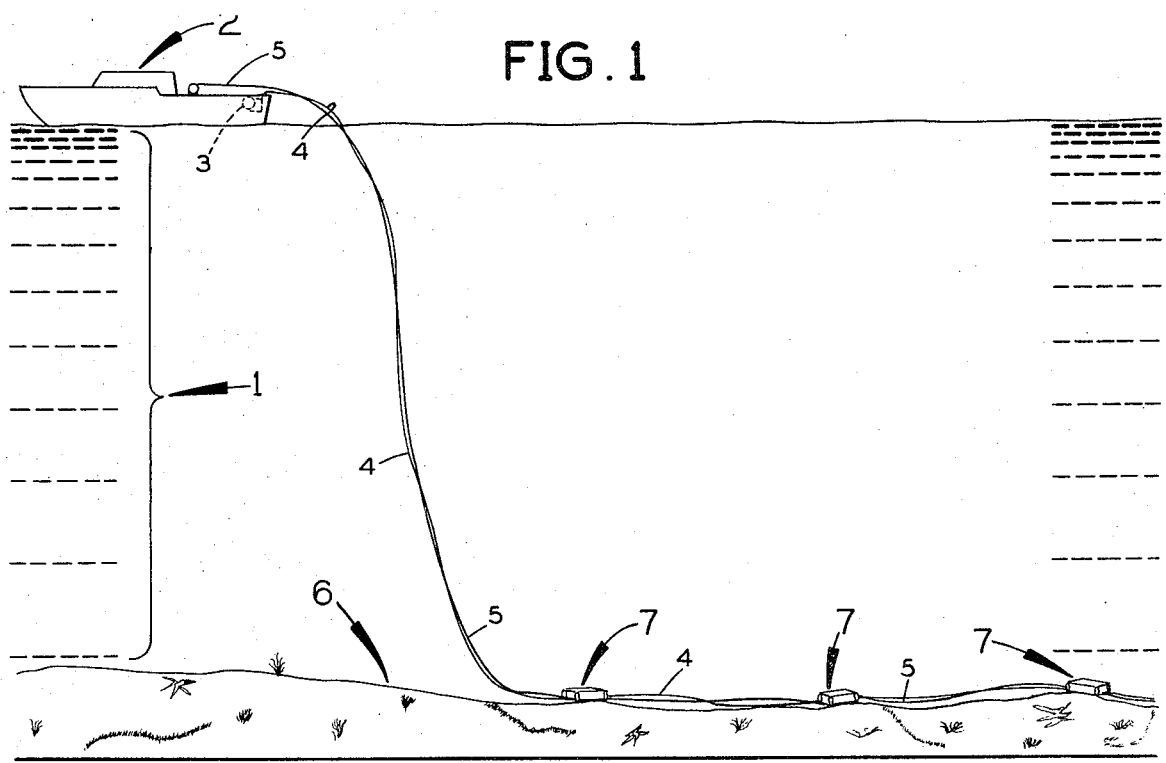
FIG. 1
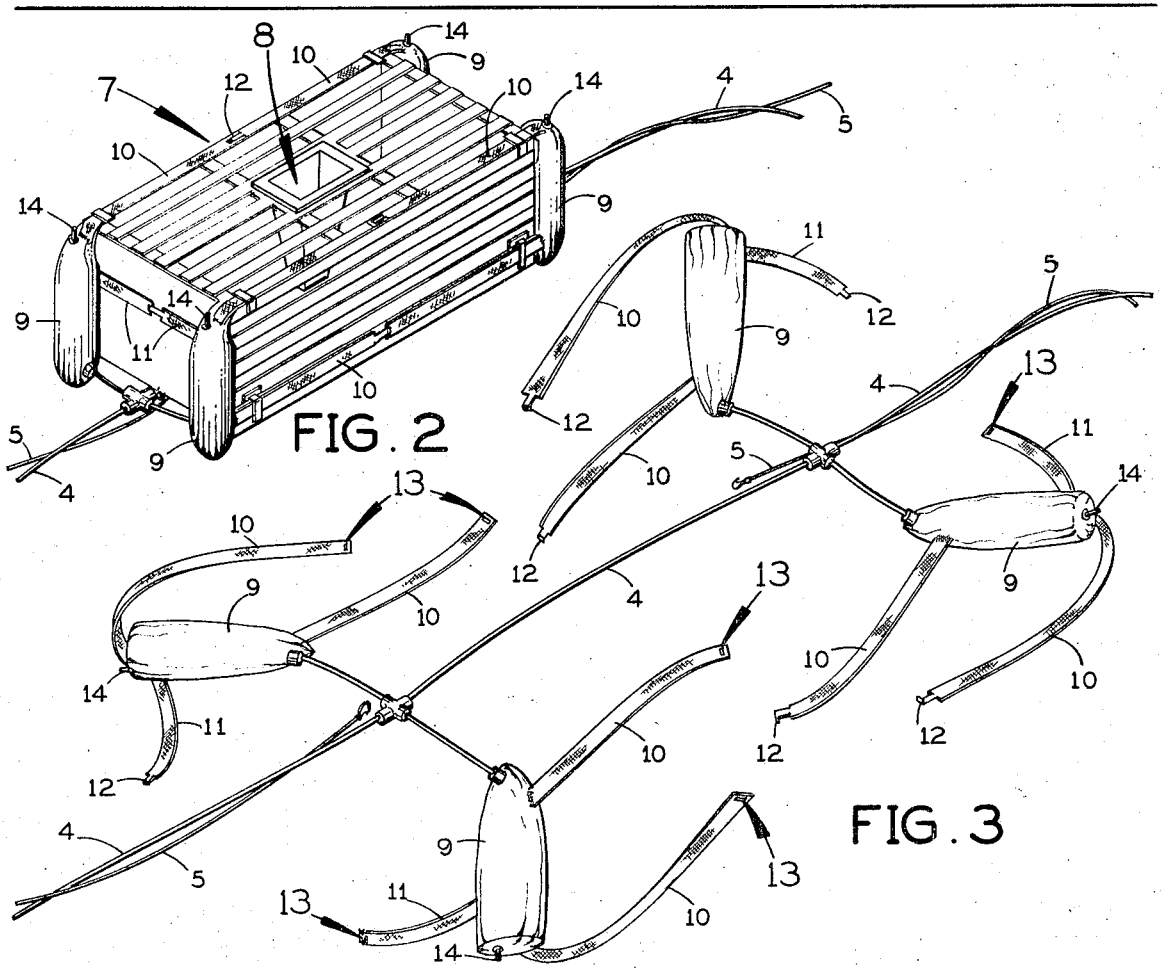
FIG. 2
FIG. 3

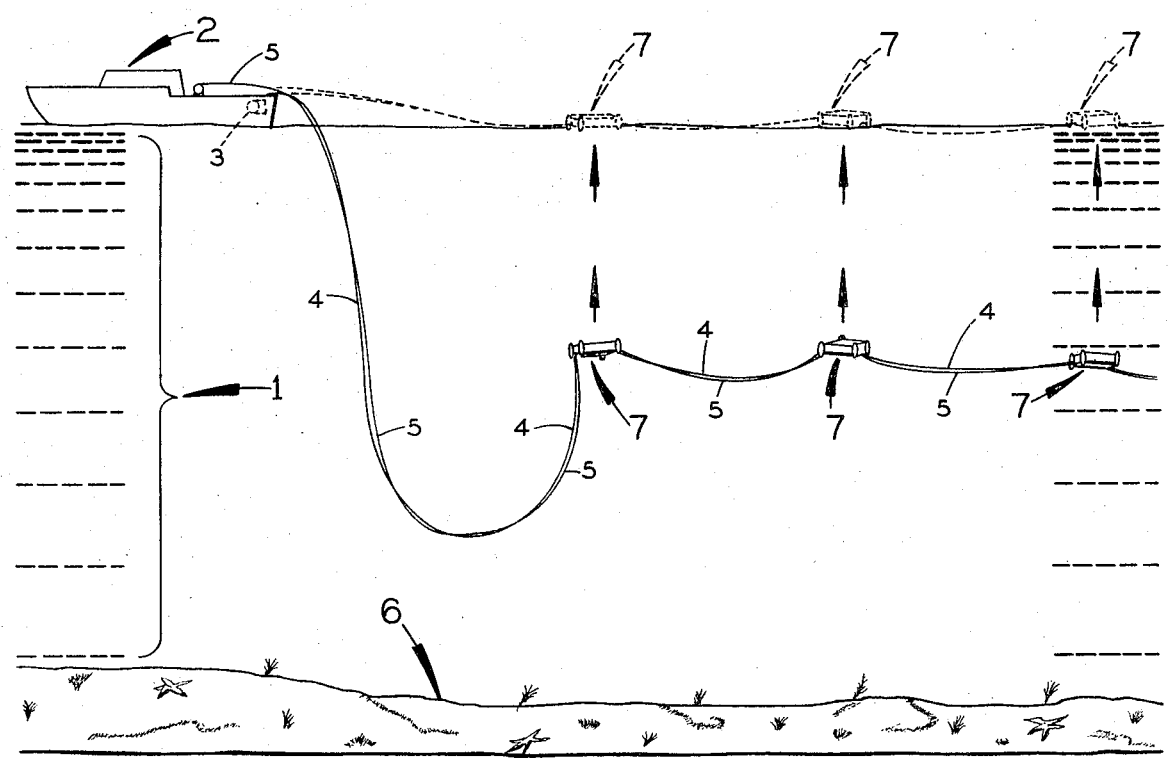
FIG. 4
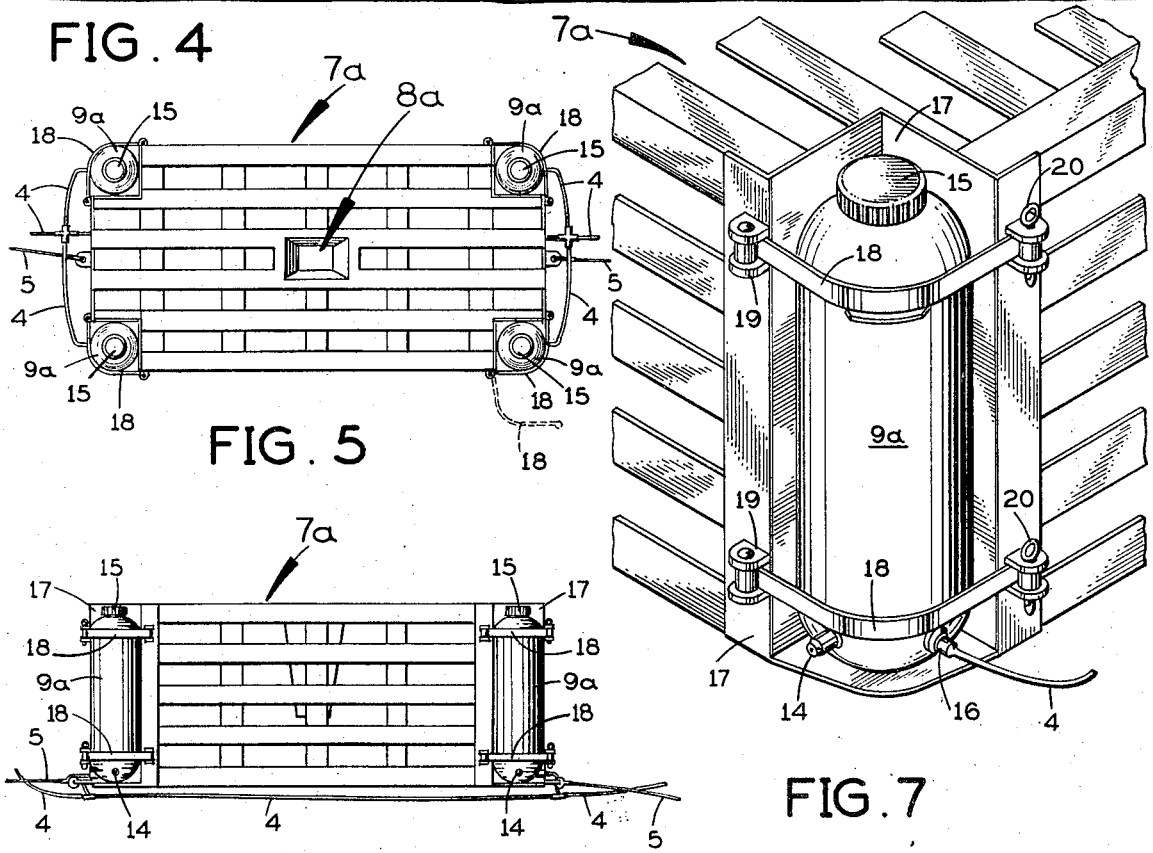
FIG. 5
FIG. 6
FIG. 7

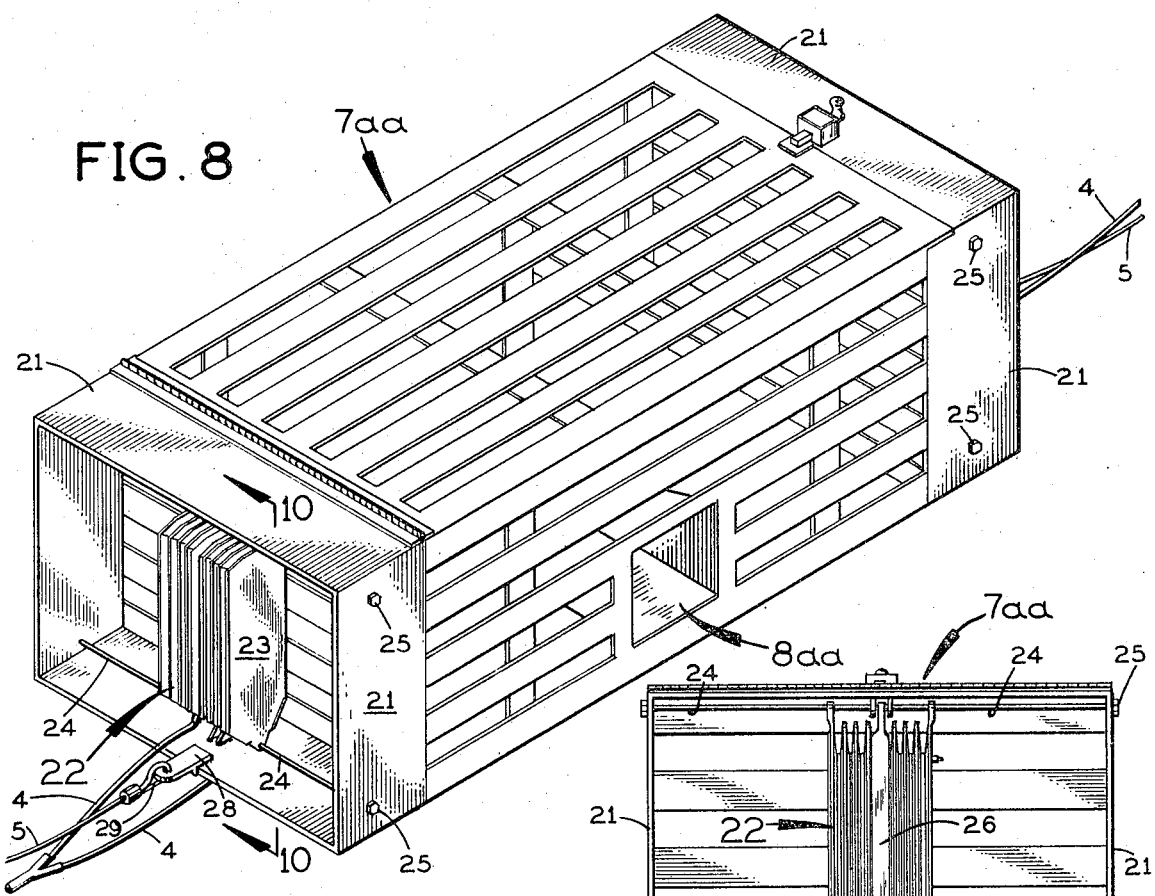

PNEUMATIC APPARATUS FOR SIMULTANEOUSLY RAISING A PLURALITY OF LOBSTER TRAPS FROM THE BOTTOM TO THE SURFACE OF A BODY OF WATER

This invention relates in general to lobster fishing as well as fishing of other forms of sea life, which fishing is usually conducted at depths of less than 50 feet.

Prior to the present invention, commerical lobster fishing was confined to rather shallow depths and involved considerable labor in baiting with portions of fish and retrieving the catch by individually raising each trap with the buoy line or retrieving the catch and rebaiting the traps on the bottom of the body of water, by manual means or by winch secured to the buoy line.

The use of the following described apparatus provides a much more economical and effective means of lobster fishing and is useful in depths of 100 feet and beyond, which depths are not normally within the range of the presently accepted procedures.

A principal object of the invention is the provision of a plurality of lobster traps with each secured to a line and one end of an air hose connected to a source of compressed air in a boat and each of said traps having an inflatable member attached thereto connected to said hose for inflation thereby when pressurized air is carried by said hose, which has a closed outer end. When the air pressure in the inflatable members of each trap is raised to a predetermined degree all of the traps connected will rise from the bottom to the surface of the water for convenient removal of the catch and re-baiting.

Another object of the invention is the provision of a line of high tensil strength connected between the boat and the first trap and each following trap for protecting the hose from high stress damage. It is also possible to connect the boat with the spaced traps by using special high tensil strength hose with corresponding suitable air hose connectors.

A further object of the invention is the provision of one or more non-expandable floats, such as formed from sheet metal or rigid plastic material, which normally may be filled with water for submersion for the descent of the floatation means and its trap to the bottom of the water and whereby the pressurized air connected to the input end of the hose will eject the water through the pre-adjusted valves in the lower end of each float and permit the compressed air to replace the water and raise each floatation means and trap to the surface for servicing.

Another object of the invention is the provision of an accordion-like pleated float secured for expansion on each end of a trap with each float connected to the hose and including a guide means wherein the opposite floats will expand in accordion fashion and retain a high volume of compressed air to rapidly overcome gravity and raise each trap to the surface of the water.

These and other objects and advantages in one embodiment of the invention are described and shown in the following specification and drawing, in which:

FIG. 1 illustrates a body of water with three of a plurality of traps resting by gravity on the bottom and connected by a stress line and air hose to a boat on the surface of the water.

FIG. 2 is a perspective view in reduced scale of a lobster trap having an inflatable collapsible elastomer float secured at each opposite end thereof and illustrating the stress line and hose connected thereto.

FIG. 3 is a perspective illustration of the system of straps and tension cable and hose connection to the collapsible floats.

FIG. 4 illustrates three traps of a plurality thereof when their floatation means is supplied with compressed air from the boat and they are partially raised.

FIGS. 5 and 6 are top plan and side views of a lobster trap in which four sheet metal or plastic floats are secured in the corners thereof for raising the trap when the water in the floats is displaced by pressurized air.

FIG. 7 is a perspective fragmentary enlarged view of one of the metal floats with a means for securing same in each corner of a trap.

FIG. 8 is a perspective view in reduced scale of another form of pneumatic lift wherein an accordion-like float is secured for transverse movement in opposite ends of a lobster trap in which both of the accordion members are connected to the air hose.

FIG. 9 is an end view of the accordion-like float in its collapsed position.

FIG. 10 is a fragmentary view with a portion of the float broken away for illustrating the flexible accordion junctions and the removable stress line fasteners.

FIG. 11 is an end view, the same as FIG. 9, with the accordion float in expanded position.

FIG. 1 illustrates a body of water 1 having greater depth than normal for lobster fishing including a power boat 2 with a source of manually controlled compressed air 3 to which a hose 4 and a tension line 5 are retained in close proximity with each other extending to the bottom surface 6 with both the hose and the line connected to three spaced trap assemblies 7 which are part of a larger plurality, not shown.

FIG. 2 illustrates a typical slat type trap assembly 7 in perspective view having a trap entry 8 on each side thereof. The hose 4 with connections to the floats and the tension line 5 will be hereinafter described. Four collapsible elastomer floats 9 are secured to opposite ends of the trap by strap means 10 and 11 with floats and straps shown in open perspective position in FIG. 3, which straps are connected together by hooks 12 which are adapted to engage mating holes 13 around the trap as shown in FIG. 1.

Each float 9 has an adjustable spring loaded air escape valve 14 which valve is adjusted in relation to the depth of the water in which the fishing is accomplished. In accordance with the well known formula HD/144, which establishes the pressure per square inch at any depth with the D representing the density of approximately 62 pounds and H representing the depth in feet, then the pressure for any given depth is easily computed and sufficient pressure released into hose 4 to overcome the static pressure of the water at any particular depth in order to raise the trap.

FIG. 4 illustrates the procedure of raising the traps to the surface of the water by the conduction of compressed air through the hose to all of the traps secured there and retained by tension line 5, which line is usually withdrawn by a well known winch, not shown. The hose is usually hand coiled in the boat but also subject to being withdrawn and released by a winch, when a rotary air coupling is provided.

The position of the raised traps on the surface of the water are illustrated by dotted lines which are the result of the inflation of the floats 9 by compressed air conducted through the hose 4.

FIGS. 5, 6, and 7 show an alternate form of floats 9a which are formed of sheet metal or molded from substantially rigid plastic material of substantially uniform thickness. Each float is equipped with a screw type filler cap 15 for the rapid entry of water which will be retained therein by a check valve 16 shown in FIG. 7 at the lower end of the float and connected to the hose 4 to prevent water from entering the latter. The floats 9a are readily retained in the slat type trap by means of a right angle sheet metal stamping 17 secured in each corner of the trap and having a pair of hinged bands 18 pivoted in hangers 19—19 and the opposite ends held with the same hangers 19—19 with a pair of removable pins 20 for the convenient removal and replacement of the floats 9a.

FIG. 6 is a side elevation of the trap showing the entry 8 which is positioned in both sides of the trap assembly 7a.

FIG. 8 is a perspective view of another alternate form of trap assembly 7aa which illustrates the trap entry 8aa positioned in opposite sides of the trap as used in some areas. This particular trap assembly shows another alternate float which includes a rectangular metal open end portion 21 which is secured to the slat type trap which serves as a housing for an accordion type float assembly 22, which is mounted for transverse movement within each enclosure 21 and slidably supported for opposite reciprocation of each half thereof on a pair of transverse parallel rods 24—24 which are secured in opposite sides of the enclosure 21 by suitable fasteners 25—25.

FIG. 9 shows the accordion float in its deflated compacted position in which a stationary central member 26 is secured in the central balanced position with respect to the trap on rods 24—24, as shown.

The cross sectional view, FIG. 10, illustrates the flexible marginal portion of each flexible fold in the float and also illustrates the relatively large volume capacity of the unit. FIG. 10 also clearly shows an eye 28 secured to the enclosure 21 which is engaged by a snap 29 at the ends of all of the lengths of tension line 5. FIG. 10 also illustrates the hose 4 connected to the central portion of the float. The inlet connection 30 of the float is provided for attachment with hose 4.

FIG. 11 shows the accordion float when in its total expanded position and retaining a large volume of air for the upward floatation of the trap.

It is to be noted that a different accordion float may operate perfectly well with only one side thereof adapted for movement, provided it is oppositely positioned on opposite ends of the trap.

It is to be noted that the presently described normally submergable lobster traps incorporate the well known inward convergent funnel as the trap member, which may be made of a wide variety of materials and size for trapping a variety of sea life for food, as well as marine specimens.

It is also to be noted that the floats for a trap may be a single unit or in a wide range of shape and made of a wide range of materials different than those shown, and responsive to raise a plurality of collapsible traps when pressure inflated by a single hose.

It is further to be noted that a plurality of tanks of the general character of that shown as 9a in FIGS. 5-6 can be filled with water for sinking the traps and by pumping pressurized water from the boat through the hose into all like floats of the traps, since the air trapped therein will be forced out through the float valves and the hose transferred to the source of pressurized air for raising, which will force the water from the hose and the floatation tanks through the escape valves in all floats and raise the traps to the surface.

It is to be noted that the input end of the hose may be disconnected from the boat and closed and retained by a buoy on the surface of the water or submerged by well known means equipped with automatic mechanism to release the end of the hose to rise to the surface when triggered by a sonar signal.

It is to be understood that certain modifications in construction are intended to come within the teachings and scope of the above specification.

Having described my invention, I claim:

1. A pneumatic apparatus for lobster fishing comprising a plurality of lobster traps having a collapsible float means secured to each said trap, each of said traps secured in predetermined spaced relation along an outer portion of an air conducting hose which has an air connector secured to each said float means on each of said traps with the hose terminating at the outermost one of said traps, each of said float means being formed from a collapsible and inflatable elastomer sheet material of uniform thickness and secured in each vertical corner of said trap by removable strap means for providing rapid descent of each of said traps when said float means are collapsed, a source of compressed air in a fishing boat on the surface of the water, the foremost end portion of said hose having a predetermined length from the first said trap and the input end thereof being connected to a manually controlled said source of compressed air whereby the plurality of pre-baited traps secured along said hose are gravity descended to the bottom surface and following a predetermined trapping interval the traps are substantially raised to the surface of the water by the conduction of compressed air into said input end of said hose and inflating all of said collapsed float means and whereby all of the said traps will be raised substantially simultaneously to the surface of the water for the convenient extraction of the catch therefrom.

2. A pneumatic apparatus for lobster fishing comprising a plurality of lobster traps having a collapsible float means secured to each said trap, each of said traps secured in predetermined spaced relation along an outer portion of an air conducting hose which has an air connector secured to each of said float means on each of said traps with the hose terminating at the outermost one of said traps, each of said float means comprising an accordion type float means secured on opposite sides of each of said traps and in the form of a normally collapsed accordion pleated tank with one end thereof secured in rigid relation with said trap and including parallel guide means therefor for free linear expansion movement from its collapsed position when supplied with pressurized air from said hose for raising said trap from its submerged position to the surface of said water, a source of compressed air in a fishing boat on the surface of the water, the foremost end portion of said hose having a predetermined length from the first said trap and the input end thereof connected to a manually controlled said source of compressed air whereby a plurality of pre-baited traps secured along said hose are gravity descended to the bottom surface and following a predetermined trapping interval the traps are substantially raised to the surface of the water by the conduction of compressed air into said input end of said hose and inflating all of the said collapsed accordion pleated tanks and whereby all of the said traps will be raised substantially simultaneously to the surface of the water for the convenient extraction of the catch therefrom.

* * * * *